Figure 1:
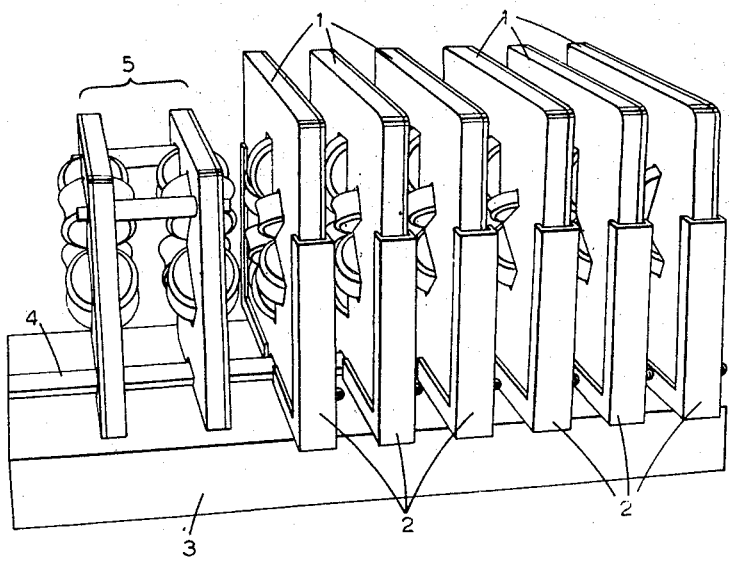

Aug. 9, 1960  J. R. PENROSE  2,948,324
MANUFACTURE OF TUBING AND TUBULAR SHEATHING
Filed Oct. 18, 1956  6 Sheets-Sheet 1

JAMES R. PENROSE
INVENTOR
by Eugene E. Stevens
ATTORNEY.

Aug. 9, 1960 J. R. PENROSE 2,948,324
MANUFACTURE OF TUBING AND TUBULAR SHEATHING
Filed Oct. 18, 1956 6 Sheets-Sheet 2

JAMES R. PENROSE
INVENTOR
by
ATTORNEY.

Aug. 9, 1960  J. R. PENROSE  2,948,324
MANUFACTURE OF TUBING AND TUBULAR SHEATHING
Filed Oct. 18, 1956  6 Sheets-Sheet 3

JAMES R. PENROSE
INVENTOR
by
ATTORNEY.

Aug. 9, 1960    J. R. PENROSE    2,948,324
MANUFACTURE OF TUBING AND TUBULAR SHEATHING
Filed Oct. 18, 1956    6 Sheets-Sheet 5

JAMES R. PENROSE
INVENTOR
by
ATTORNEY.

United States Patent Office 2,948,324
Patented Aug. 9, 1960

2,948,324

MANUFACTURE OF TUBING AND TUBULAR SHEATHING

James Ronald Penrose, Watford, England, assignor to Pirelli-General Cable Works Limited, London, England, a British company Filed Oct. 18, 1956, Ser. No. 616,726

Claims priority, application Great Britain Oct. 18, 1955

2 Claims. (Cl. 153—54)

The present invention relates to the manufacture of tubing and tubular sheathing, for example, for electric cables and particularly to the manufacture of such tubing and sheathing from metal strip.

In the manufacture of metal tubing such as that used for irrigation purposes, or metal sheathing for electric cables, or the like from flat metal strip, the strip may be formed into a tubular shape by passage through at least one forming means. Such means may comprise a number of components, for example rollers, whose correct adjustment relative to one another is of considerable importance in determining the quality of the finished product. This is particularly the case where, in order to avoid costly machining, a non-circular cross-section is given to the strip form by using rollers or similar components each of which is arranged to touch the strip along a profile which, for each individual roller, has only a single radius of curvature. The difficulty of obtaining accurate relative adjustment of components and in setting up generally is most apparent in conventional apparatus of this type when tubing of new dimensions is to be made, necessitating replacement of components. Generally more than one forming means is used so that the tubing is formed from strip in successive steps, and in some cases the replacement of components and their correct adjustment in a number of forming means preparatory to the formation of a new type of tubing may take a day or more to complete. In particular, the successive forming means will generally need to be moved nearer together or further apart in accordance with the change in diameter of the tubing to be manufactured.

It is an object of the present invention to provide apparatus in which the above difficulties are greatly reduced.

It is a further object of the present invention to provide a method of forming tubing from thin metal strip of high tensile strength wherein the danger of kinking or similar deformation is substantially eliminated.

According to the present invention, in apparatus for the manufacture of tubing and tubular sheathing from metal strip including forming means comprising a number of components such as rollers, the components are carried by a single plate or planar framework placed transversely to the direction of passage of the strip through the forming means.

The plate or planar framework may be so arranged in the apparatus that it is readily replaceable by another such plate or framework having components or an arrangement of components adapted for the manufacture of a different type of tubing. Alternatively, or in addition to such easy replacement of the plate or framework, the individual components carried thereon may be made replaceable, their position on the framework may be adjustable on brackets or the like, and such brackets may themselves be made replaceable.

The apparatus may include a plurality of plates or planar frameworks each carrying forming means comprising a number of components such as rollers, and such plates or frameworks may be readily replaceable either individually or in sets required for the manufacture of each different type of tubing. Replacement may be effected by inserting the plates or frameworks into slotted supports in the apparatus, alignment being assisted by the provision of a keyway.

The invention also includes a method of manufacturing tubing and tubular sheathing from metal strip, wherein a plurality of forming means are placed so closely together that the cross sectional form or shape of the strip changes continuously from substantially flat to substantially closed form such as circular, as it passes through the forming means. Thus, the strip should funnel in continuously. This method is particularly useful when metal of high tensile strength and resilience, such as stainless steel, mild steel, or aluminium alloy is employed; such metals tend to spring open between successive forming means if these are widely spaced and the strip is comparatively thin, the irregularity in forming tending to cause kinking and similar deformation.

Apparatus for use with this method preferably includes a plurality of frameworks of the above-mentioned kind, which is particularly suitable for close spacing of the forming means. The components mounted on the plates or frameworks may be rollers, each of the principal rollers being arranged to touch the metal strip tangentially along a profile which, for each individual roller, has only a single radius of curvature. At least three such rollers may be employed, the centre portion of the strip being arranged to be formed on a roller whose profile has a radius of curvature generally greater than that of the finished tubing, while the two sides of the strip are arranged to be formed on rollers whose profiles have radii of curvature substantially equal to that of the formed tubing, but, exceptionally with some types of material, e.g. stainless steel, at least one radius of curvature may be slightly less than that of the formed tubing.

After the strip has been formed into a substantially cylindrical or other closed shape, the sides may be welded together between components mounted on further plates or frameworks either side of the welding means. These components may be rollers mounted on plates, and these plates may be movable along the same keyway as is provided for the main plates or frameworks.

Figure 2:
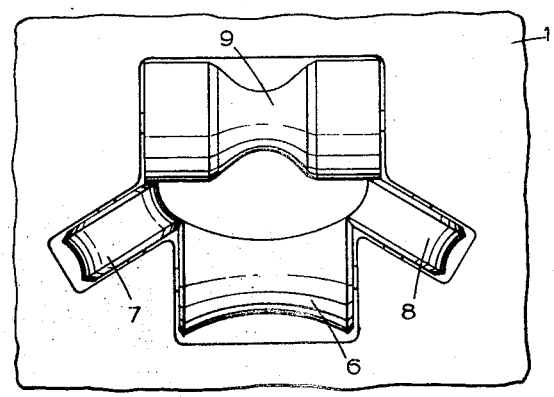
Figure 3:
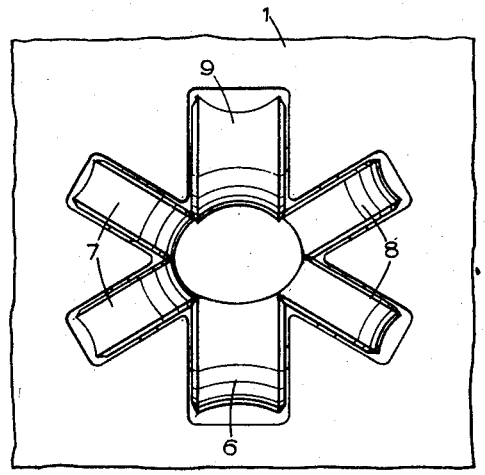
Figure 4:
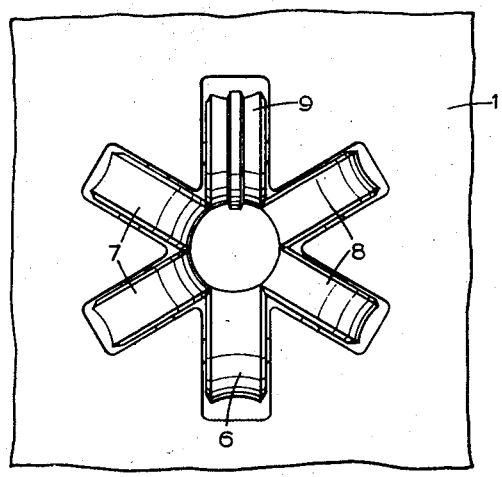
Figure 5:
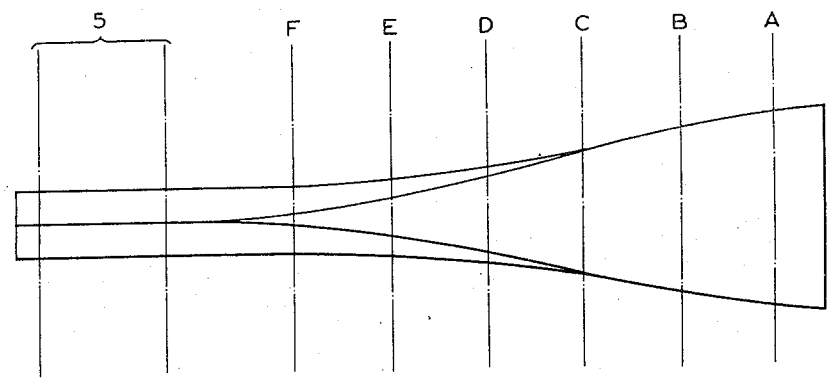
Figure 6:
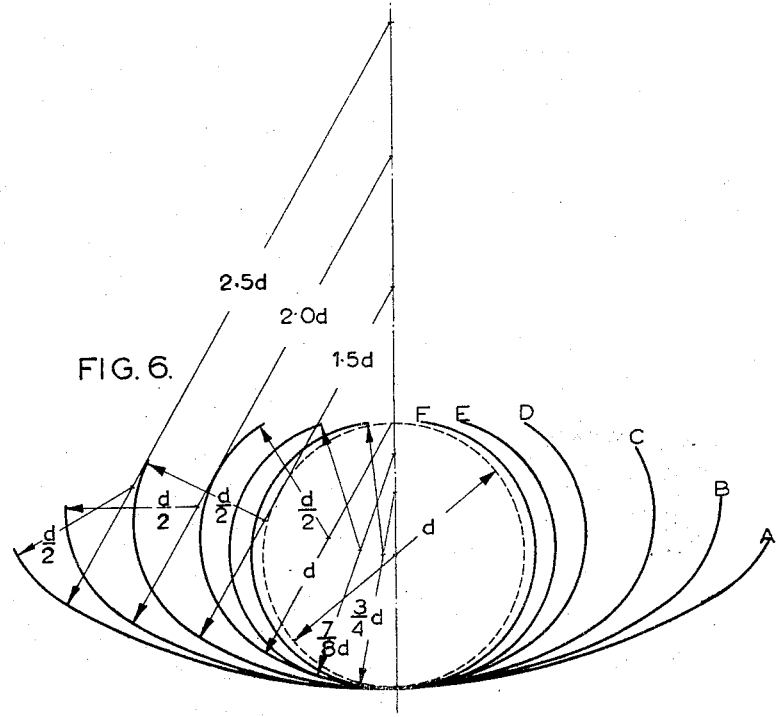
Figure 7:
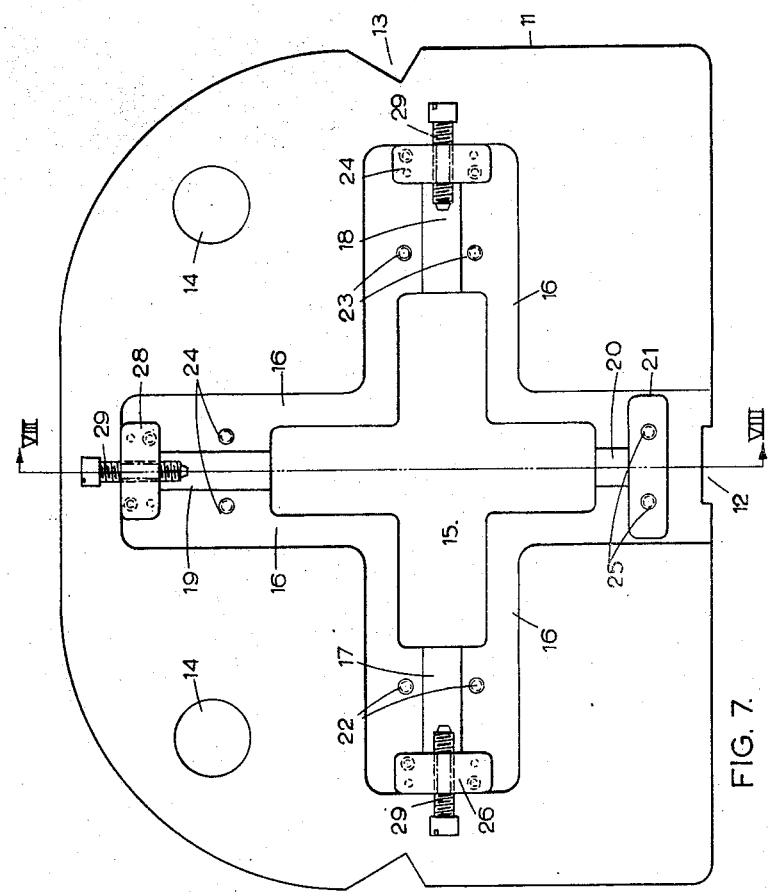
Figure 8:
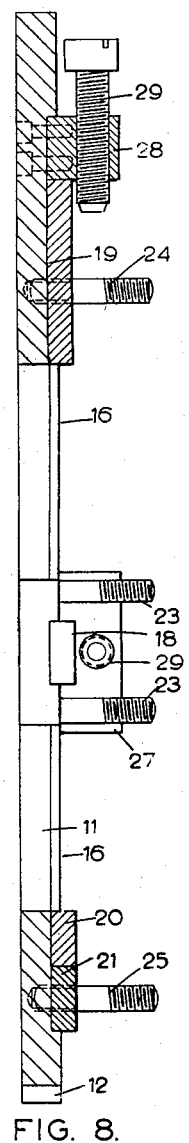

An apparatus for the manufacture of tubing and tubular sheathing in accordance with the present invention will now be described by way of example with reference to the accompanying drawings in which:

Figure 1 is a perspective view of the apparatus,

Figures 2, 3 and 4 are fragmentary views of plates suitable for use in the apparatus showing the shape and arrangement of rollers which together comprise the forming means, Figure 5 shows a plan view of the strip as its cross-sectional form or shape is changed continuously, Figure 6 is a view showing this form or shape at successive points indicated on Figure 5, Figures 7 and 8 are an elevation and cross-section (on line VIII—VIII) respectively of a plate for use in an apparatus in which the rollers are adjustable, Figure 8 being on an enlarged scale.

Figure 10:
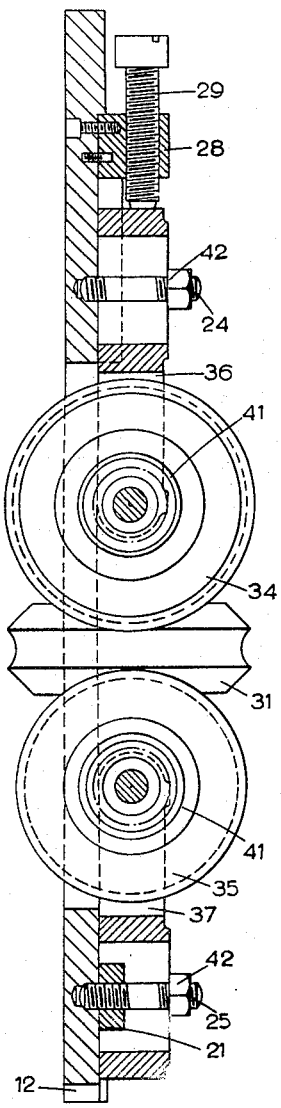
Figure 9:
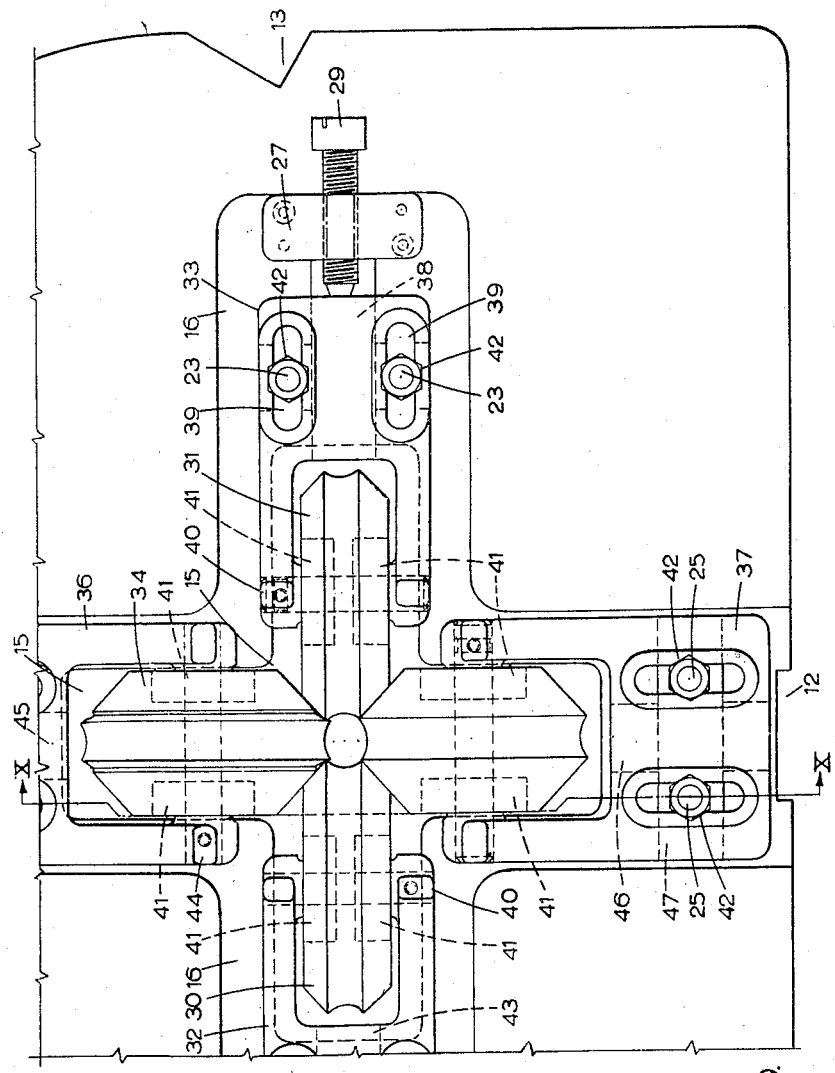

Figures 9 and 10 are an elevation and cross-section (on line X—X) respectively, similar to those of Figures 7 and 8, showing the plate with the replaceable and adjustable roller supporting means and the rollers assembled thereto, Figure 9 being on a larger scale than Figure 7, and Figure 10 being on the same scale as Figure 8.

Referring now to Figure 1, six metal plates 1 are inserted in position in slotted supports 2 on a base 3 and firmly secured by means of grub screws or the like 1a after proper alignment assisted by a key 4, portions of the plates 1 being cut out to fit over the key 4. The base 3, which should be rigid and have the slotted supports 2 rigidly attached thereto, although means may be provided for varying the separation of these supports, is extended with the key 4 to assist in positioning the welding portion 5. This consists of two further plates between which the welding means (not shown) is mounted.

Referring also to Figures 2–4, each of the plates 1 has a portion cut out to allow rollers 6, 7, 8, 9 mounted on spindles positioned in the central plane of the plate to be carried therein. These rollers are components which together make up forming means through which the metal strip may be passed, so that the plates are placed transversely to the direction of passage of the strip through the forming means. This passage takes place from right to left in Figure 1, the strip entering the first of the six plates 1 in substantially flat form and emerging from the last of the plates and into the welding portion 5 in a form which is sufficiently close to the final form required to enable welding to take place, the last stage in the closing operation being performed if necessary by the forming means mounted on the first of the two further plates in the welding portion 5. Although the rollers are shown freely mounted in the plates 1, the strip being considered to be pulled through by means situated to the left of the figure or carried on a transversely flexible belt which passes through the forming means with the strip, the rollers on one or more of the plates 1 may themselves be driven to provide the necessary motive force for the passage of the strip through the apparatus.

The method of manufacturing tubing and tubular sheathing is shown in Figures 5 and 6. Essentially, the spacing of the plates in the apparatus is chosen to be so close that the cross-sectional form or shape of the strip changes continuously, so that the strip funnels in and is never allowed to spring open to any material extent between successive plates. The cross-sectional form or shape at points A, B, C, D, E and F of Figure 5, which is equivalent to the profile given to the strip at each of the six plates as it proceeds from right to left in Figure 1, is as shown in Figure 6.

For convenience in showing the progressive reduction in the radius of curvature of the strip, and of the rollers, at successive tandem passes, and, in order to avoid undue complication of the drawing, Figure 6 shows all the cross-sections on a common base line. It will be understood, however, that, in fact, the bottom of the strip moves down as the edges move up so that half the height of the strip is always substantially on the centre line of the tube. It is also to be understood that the method is not restricted to this particular cross-sectional sequence, nor to six stages, but resides principally in the fact that the funnelling action is continuous and proceeds between successive stages. Thus the strip is always tangential to the rollers when it encounters them, and "scuffing" or running up the rollers abruptly after a period of constant or widening cross-sectional shape due to the resilience of the metal is avoided. Such an effect, which is particularly liable to occur with metals of high tensile strength and resilience such as stainless steel, mild steel or aluminum alloy, tends to cause kinking and similar deformation, the defect being particularly noticeable with thin strip; for example, stainless steel ten thousandths of an inch thick. With aluminum alloy, the rollers may also tend to pick up metal from the strip, this later causing surface impairment of the strip itself.

Each of the principal rollers is arranged to touch the metal strip tangentially along a profile which has only a single radius of curvature; thus, in Figures 2–4, rollers 6, 7 and 8 have arcuate profiles, thus facilitating machining of these components. The succession of cross-sectional forms shown in Figure 6, which has been found particularly suitable for forming with closely spaced plates, also has the advantage that only three arcuate rollers are needed at each stage, though more may be employed for convenience and two further cylindrical rollers may be used to press upon the edges of the strip and keep it in position. One of these rollers, whose profile has a radius of curvature generally greater than that of the finished tubing—number 6 in Figures 2–4—forms the centre portion of the strip into the correct curvature while two others whose radii of curvature are equal to that of the finished tubing—numbers 7 and 8—form the sides of the strip.

As shown in the example of Figure 6, where $d$ is the diameter of the finished tube, the radius of curvature of the bottom centre roller 6 decreases in successive stages whilst the radius of curvature of the side rollers 7 and 8 may remain unchanged and equal to that of the finished tube at successive stages.

Roller 9 is inserted principally as a guide for cable or the like where this is required to be sheathed, but also in the stages shown this roller performs the function of the two planar rollers above mentioned and presses upon the edges of the strip, either by using cylindrical portions of the roll (Figure 2) or edges thereof (Figure 3) or a projecting rim therein (Figure 4); in this latter case roller 9 also aids rollers 7 and 8 in forming the sides of the strip. It may be convenient to use relatively small rollers by splitting up the contour further; thus rollers 7 and 8 are shown double in Figures 3 and 4. The cross sectional forms imparted to the strip in Figures 2, 3 and 4 correspond respectively to those at B, D and F in Figures 5 and 6; i.e. to the second, fourth and sixth plates encountered by the strip as it passes from right to left in Figure 1. The two plates in the welding portion 5 also have roller components mounted on them; if the tube is completely closed by the time it reaches the first of these plates, both sets of rollers will be adjusted to maintain the closed cross-sectional form; thus in the present case four rollers are provided each contributing equally to produce a circular cross-sectional shape. If the tubing is not quite closed on reaching the first of the two plates, the rollers on the plate may be slightly opened out so that the tube touches them tangentially while, however, ensuring that closure is effected before the welding means, situated between the two plates, is reached.

Each plate is readily replaceable by another having different rollers or a different arrangement of rollers adapted for the manufacture of a different type of tubing. For large tubes, where it may be required to change from the manufacture of 2" or 4" tube, sets of plates are provided adapted for the manufacture of each size. These may quickly be inserted in the slotted supports 2 (Figure 1) in place of the former set of plates 1, alignment being assisted by the key 4. In the case of large changes of this kind it may also be necessary to alter the spacing of the slotted supports 2. Where small tubes, of the order of ¼" to 2", are to be formed, it may be more convenient to make the individual rollers on each plate replaceable. It will normally also be necessary to adjust their position on the plate, for which purpose they may be held on brackets, such as U-shaped brackets.

An arrangements of this kind is shown in Figures 7 to 10 of which Figures 7 and 8 show one plate in greater detail than in Figures 1 to 4, whilst Figures 9 and 10 show the plate with the rollers and the roller supporting and adjusting means assembled thereto to form one complete forming stage in the manufacture of tubing or tubular sheathing.

Referring to these figures, and more particularly to Figures 7 and 8, the support plate 11 is of mild steel, for example of 16 mm. thickness, having a central keyway 12 at the bottom for aligning the plate with other plates as already described. Additional alignment is provided by side notches 13 and by holes 14 to co-operate with suitably shaped guiding supports (not shown).

A cruciform slot 15 is cut centrally in the plate to accommodate four forming rollers, to be referred to below, and the marginal surface 16 round the slot is machined flat as a datum surface. The two centre lines, which pass through the four arms of the slot, will lie on the axis of the finished tube, and these centre lines will define the positions of the respective forming rollers. For this purpose four slots are machined in the surface of the plate on these centre lines to accommodate cast steel keys secured therein, three of which 17, 18 and 19 will serve for fixing the supports for the two side rollers and the top roller whilst the fourth key 20, together with a further key 21 at right-angles thereto serve for the bottom roller. Pairs of locating studs 22 to 25 are also secured in the block symmetrically of the centre lines through the slot-arms. Thrust blocks 26, 27 and 28 are screwed to the plate at the end of each of the keys 17, 18 and 19 respectively, and are each tapped to receive a thrust screw 29.

Referring now also to Figures 9 and 10, the pair of side rollers 30 and 31 are carried in a pair of forks 32 and 33, whilst the top and bottom rollers 34 and 35 are carried on a pair of similar forks 36 and 37 respectively, the latter pair of forks being of wider dimension to take the correspondingly thicker rollers. It will suffice to describe only one of these forks, namely fork 33, in detail. A keyway 38 is cut on the fork axis to fit the corresponding key 18 of the plate 11, and a pair of slots 39 are cut on each side of the keyway to take the fixed studs 23. The roller 31 is rotatable, between the arms of the fork 33 upon a spindle 40 by means of ball bearings 41 seated in the sides of the roller. It will be seen that the lateral adjustment of the roller 31 with respect to the axis of progression of the finished tube is provided by the slots 39, the key and keyway 18, 38 and the thrust screw 29, and that the fork, and with it the roller, can be secured in each adjusted position by means of the thrust screw 29 and the studs 23 with screwdown nuts 42. Also by virtue of the same means the assembly of the fork and roller can be removed and replaced so that rollers of different contour can be used when desired. The arrangement of fork 32 and roller 30 is identical with that above described and is therefore not described in detail, the keyway being shown at 43. Similar conditions apply for the top fork 36 and roller 34 which are adjustable along keyway 45, except only that the roller spindle 44 is of greater length. The edges of the upper roller 34 are ridged as shown at 34a in Figure 9 to bear upon the upper edges of the strip as already described with reference to Figure 3.

The bottom roller 35 is, in this example, shown as non-adjustable, the keys 20 and 21 engaging with corresponding keyways 46 and 47, to hold the fork rigidly in one position.

It will be understood, however, that the bottom fork 37 could, if desired, be adjustable in the manner above described for the forks 32, 33 and 36.

In the example above described the rollers 30, 31, 34 and 35 form the fourth forming stage, also called a "pass," in a six-stage process for the manufacture of metal tubing. In the fourth pass the profile may correspond to that shown at D in Figure 6, whilst in the subsequent passes the profile of the strip undergoes further bending somewhat as shown at E and F of Figure 6. In each of these passes however, only four forming rollers may be employed using a common form of plate at each pass which is the same as that shown in Figure 7. In this process the tandem passes will again be arranged in such closely spaced relationship that the cross-sectional form of the strip changes continuously without any increase of radius of curvature of any portion of the strip between successive passes.

It should be understood however that the constructional features involved, notably the dimensions and contours of the rollers and the distance between successive planes A, B, C, D, E, F, must necessarily be determined in accordance with the various factors to be taken into consideration, namely, the diameter and thickness of the tube as ultimately formed and the material employed.

It will also be understood that the methods and apparatus above described with reference to the drawings can be used without essential change for tubing and for cable sheathing. Accordingly in the following the former term must be understood to include the latter.

What I claim and desire to secure by Letters Patent of the United States is:

1. Convertible apparatus for manufacturing tubing from metal strip in a plurality of successive forming stages arranged in tandem, comprising in combination a set of changeable forming means including a plurality of longitudinally spaced plates having aligned apertures, through which apertures the strip during its formation into a tube is successively passed, each of said plates including a series of forming rollers mounted for free rotation on its plate about an axis of rotation at right angles to the direction of travel of a strip being formed by said apparatus, and support frame means longitudinally spaced and slidably supporting each plate for free manual removal and replacement in the general plane of said plate normal to the path of movement of said strip.

2. Apparatus as set forth in claim 1, said supporting frame means being longitudinally adjustable relative to each other and having a U-shaped, outwardly opening configuration including an inwardly extending continuous U-shaped slot opening at one side of the frame and freely and slidably receiving said plates therein for ready manual removal therefrom.

References Cited in the file of this patent

UNITED STATES PATENTS

| 56,152 | Weimer | July 3, 1866 |
| 315,626 | Jackson | Apr. 14, 1885 |
| 829,990 | McKee | Sept. 4, 1906 |
| 946,303 | Worth | Jan. 11, 1910 |
| 2,098,989 | Yoder | Nov. 16, 1937 |
| 2,110,378 | Hume | Mar. 8, 1938 |
| 2,248,088 | Kane | July 8, 1941 |
| 2,764,214 | Reynolds | Sept. 25, 1956 |

FOREIGN PATENTS

| 539,770 | Germany | Dec. 2, 1931 |
| 919,405 | Germany | Oct. 21, 1954 |
| 632,996 | Great Britain | Dec. 5, 1949 |